O. HEINS & C. M. WILD.
ELECTRIC STARTING SYSTEM FOR INTERNAL COMBUSTION ENGINES.
APPLICATION FILED JUNE 12, 1915.

1,232,799.

Patented July 10, 1917.

WITNESSES
M. A. Bill
L. Maynial

INVENTORS
Otto Heins
& Charles M. Wild
BY
ATTORNEYS

UNITED STATES PATENT OFFICE.

OTTO HEINS, OF NEW YORK, N. Y., AND CHARLES M. WILD, OF SPRINGFIELD, MASSACHUSETTS, ASSIGNORS TO BOSCH MAGNETO COMPANY, OF NEW YORK, N. Y., A CORPORATION OF NEW YORK.

ELECTRIC STARTING SYSTEM FOR INTERNAL-COMBUSTION ENGINES.

1,232,799.   Specification of Letters Patent.   Patented July 10, 1917.

Application filed June 12, 1915. Serial No. 33,728.

*To all whom it may concern:*

Be it known that we, OTTO HEINS, a subject of the Emperor of Germany, residing at and whose post-office address is 336 West 88th street, in the city, county, and State of New York, and CHARLES M. WILD, a subject of the Emperor of Germany, residing at No. 14 Springfield street, Springfield, county of Hampden, State of Massachusetts, have invented certain new and useful Improvements in Electric Starting Systems for Internal-Combustion Engines; and we do hereby declare the following to be a full, clear, and exact description of the invention, such as will enable others skilled in the art to which it appertains to make and use the same.

There is disclosed in the U. S. Patent No. 1,079,725 of November 25, 1913, a normally-disengaged electric starting motor for internal combustion engines, wherein the electric connections between the battery and the motor are controlled by a switch which is actuated by the operator in such a manner that the armature is first given a combined axial and slow rotary movement for engaging the motor gear with the fly wheel gear, and then given full running current to bring the engine up to starting speed, whereupon the motor automatically disengages its gear. In this organization, the operator is required to move the switch to two successive positions corresponding to the two phases of actuation of the motor. There is no provision for compelling the movement of the switch to its second position to give full running current to the motor after the gears are engaged, and there is no provision for automatically disconnecting the battery from the motor as soon as the engine starts to operate under its own power. As a result of this lack of interdependency between the action of the motor and the switch, full running current may be supplied to the motor before the gears are engaged, thus causing a clash between the gear teeth, and racing of the motor; also if full running current is not supplied to the motor as soon as the gears are engaged, a prolongation of the starting period and a loss of battery power occur; and furthermore, if the starting switch is held closed after the motor has automatically disengaged its gear, the motor will race.

The present invention has to do with a starting motor of this kind, and the object is to subordinate the action of the starting switch to the axial movement of the armature in such manner that the circuit connections effected by the switch are at all times dependent upon the position of the motor gear relatively to the fly-wheel gear. To do this, one element of the switch is carried by the armature, either axially movable with or mounted on the armature, while the other element of the switch is stationary. In the preferred form of the invention, electrical means are provided for automatically disconnecting the battery from the motor when the engine starts under its own power, and additional electrical means may be provided for disconnecting the battery if the motor should fail to move its gear into engagement with the fly-wheel gear to start the engine.

The accompanying drawings are diagrammatic and illustrate the preferred form and several modifications within our invention, wherein, as an example, electrical contacts forming one element of the starting switch are stationary, while brushes forming the other element of the switch are movable axially with the motor armature.

Figure 1:
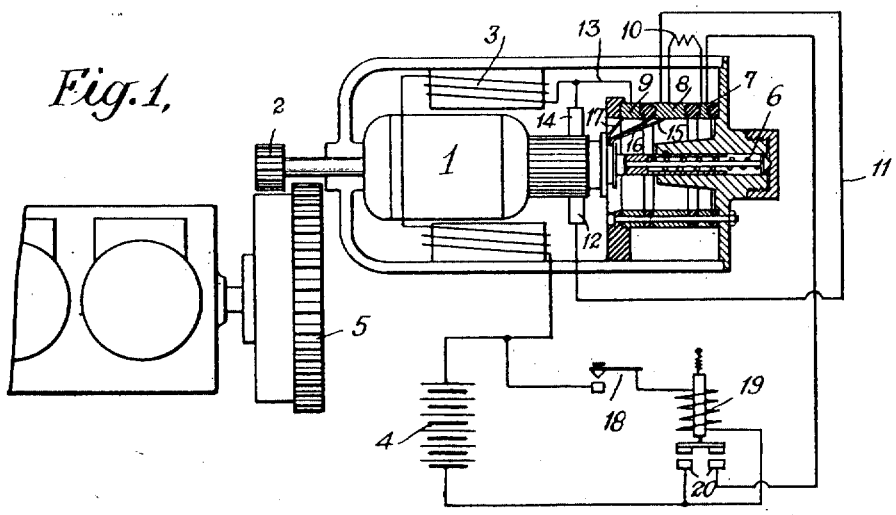
Figure 1 shows an arrangement in which the battery remains connected to the motor as long as the operator's switch is closed.

In the drawings, the armature 1 of the series starting motor carries a gear 2 which, when current is supplied to the field 3 from the battery 4, is automatically shifted into engagement with the fly wheel gear 5 against the stress of the spring 6, the armature being normally held by the spring in a magnetically de-centered position relatively to the field poles so that the gear 2 is disengaged from the gear 5. The contact segments 7, 8 and 9 are stationary, 8 being connected by a resistance 10 to contact 7, and by wire 11 to the commutator brush 12, while 9 is connected to the commutator brush 14, to which the winding of field 3 is connected by a wire 13 having a small amount of resistance. The electrically connected brushes or brush fingers 15, 16 and 17 are carried by the armature and are arranged to move axially but not rotatively therewith. When the parts are in their normal inoperative position as shown in Fig. 1, the brush 15 engages the segment 8 while the brush 17 engages the segment 9. In this position of the parts, the circuit is from the battery 4 to the segment 7 and thence through resistance 10 to segment 8, where it divides into a large part passing through brushes 15 and 17 to the field windings 3, and a small part passing by way of the conductor 11 to the brush 12, and armature winding and brush 14 to the field windings 3. The current passing through the field magnetizes the field structure sufficiently to move the armature toward its magnetically centered position, the armature gear 2 being brought into engagement with the fly wheel gear 5. The small current passing through the armature causes a slow rotary movement thereof, sufficient to bring about easy and ready engagement between the gears irrespective of the initial position of the teeth. Just after the gears have started to engage, the brush 17 leaves the contact 9, thus causing the entire current from the battery to pass through the armature 1, resistance 10 and field 3. The armature then starts to run up to speed while driving the engine. However, the armature still continues its axial movement while rotating and just before it reaches its magnetically centered position, the brush 15 engages the contact 7, thus short-circuiting the resistance 10. The total time required for the complete axial movement of the armature is very small, about one sixth of a second in commercial application.

To actuate the arrangement shown in Fig. 1, the operator closes the switch 18 to excite the winding of the electromagnet 19 from the battery 4, thus causing the electromagnet to close the switch contacts 20. The motor then engages the gears 2 and 5 and brings the engine up to starting speed, whereupon the operator should release the switch 18 to disconnect the battery from the motor. This arrangement has the defect, as compared with the arrangements hereinafter described, that as soon as the current flowing into the armature reaches a predetermined low value, which occurs substantially at the time that the engine starts to operate under its own power, the magnetic force tending to hold the armature in its centered position is overcome by the spring 6 and the motor gear starts to move out of engagement with the fly wheel gear. Before these gears are completely disengaged, the brush 17 again engages the contact 9, thereby giving the field sufficient current to bring about a return movement toward complete engagement of the gears. Thus an axial oscillation of the armature will be set up, and will continue until the operator releases the switch 18.

Figure 2:
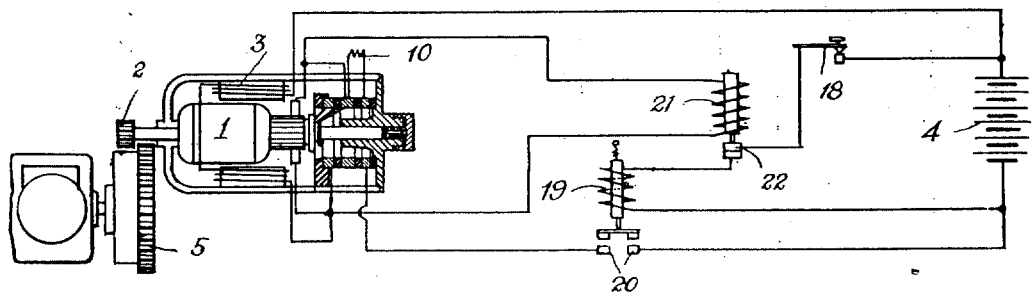
Fig. 2 shows an arrangement in which the battery is automatically disconnected from the motor when the voltage across the terminals of the motor armature reaches a predetermined value.

The arrangement of Fig. 2 is similar to that of Fig. 1 excepting that an additional electromagnet 21 is used. The winding of this electromagnet is connected across the commutator brushes of the motor, and the contacts 22 controlled by the electromagnet are maintained closed until the electromotive force across the armature reaches a predetermined high value. Thus when the switch 18 is closed by the operator, the winding of the electromagnet 19 is excited from the battery through the contacts 22, but as soon as the motor reaches the speed at which the electromotive force across its terminals attains the predetermined value, the contacts 22 separate and then the contacts 20, so that the battery becomes disconnected from the motor. The winding of the electromagnet 21 is so calculated that it separates the contacts 22 at substantially the time that the engine starts to operate under its own power, and as a result of the automatic disconnection between the battery and the motor, the armature gear 2 is allowed to move entirely out of engagement with the fly wheel gear 5.

Figure 3:
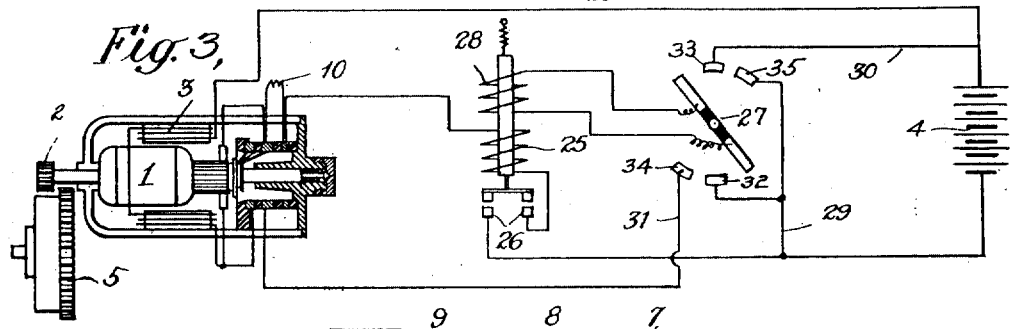
Fig. 3 shows the preferred form wherein the battery is automatically disconnected from the motor either when the starting current reaches a predetermined low value, or if the motor gear should initially fail to engage the fly wheel gear.
Figure 4:
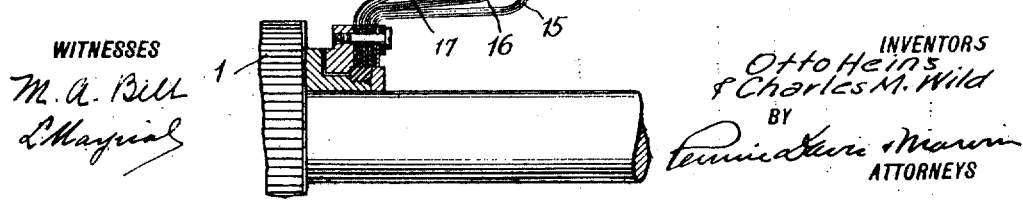
Fig. 4 is an enlarged view of the switch actuated by the motor armature.

In the arrangement shown in Fig. 3, not only is the battery automatically disconnected from the motor at substantially the time that the engine starts to operate under its own power, but the battery is automatically disconnected from the motor in case the armature should initially fail to bring the gear 2 into engagement with the gear 5. In this arrangement, the electromagnet winding 25 is connected in series with its contacts 26 between the battery 4 and the segment 7, and this winding is so calculated that when the current passing through it and into the starting motor reaches a predetermined low value, the magnetic attraction is overcome by a spring to open the contacts 26 and thereby disconnect the battery from the motor. The operator's switch 27 in this case is of the rotary snap type, and its operation causes the winding 28 first to be connected to the battery 4 through the wires 29 and 30 and contacts 32 and 33, in such a sense that the winding 28 assists the winding 25, and immediately thereafter to be connected in the opposite sense across the resistance 10 by the wires 29 and 31 and the contacts 34 and 35. The period of time in which the winding 28 remains connected to the battery should slightly exceed the time required for the armature to move axially from its normally inoperative position to the position in which the brush 15 engages the segment 7. Thus if the gears 2 and 5 should become engaged in the manner intended, the winding 28 is connected across the resistance 10 only after the resistance has been short-circuited. If, however, the armature should initially fail to engage the gears 2 and 5, the position of the armature will at that time be such that the resistance 10 is not short-circuited, and the current then flowing through the winding 28 would produce a counter magnetic action sufficient to separate contacts 26.

Thus in order to start the engine in the arrangement shown in Fig. 3, the operator turns the switch 27 through its full movement, whereupon the electromagnet winding 28 is excited from the battery for a sufficient time to close the contacts 26 and to allow the armature to engage the gears 2 and 5. If, for any reason, the gears should not become engaged, the contacts 26 will be separated immediately and the operator will again operate the switch 27. In the normal operation, the gears 2 and 5 engage immediately, and the switch 27 connects the winding 28 across the resistance 10 after the resistance is short-circuited. As soon as the motor has brought the engine to a predetermined speed, sufficient to start the engine under its own power, the winding 25 is insufficiently excited by the current then flowing through the armature, and the contacts 26 are opened by a spring, thereby disconnecting the battery from the motor and permitting the armature to completely disengage the gears 2 and 5, and to come to rest.

Having thus described our invention, what we claim is:—

1. In a starting system, an internal combustion engine having a starting gear, an electric starting motor of the series type having a normally decentered axially-movable armature which carries a normally disengaged gear engageable with the engine gear upon axial movement of the armature, a source of current supply for the motor, a switch having one element axially movable with the armature and having the other element stationary, and electrical connections, including a resistance, between the source of current supply and the switch, one element of the switch comprising a plurality of electrically insulated contact segments, and the other element comprising a plurality of electrically connected brush fingers adapted to engage the segments in appropriate relation for first connecting the resistance and motor field winding in series with the source of current supply and also short circuiting the motor armature winding, and for then short circuiting the resistance and connecting the motor armature and field windings in series with the source of current supply.

2. In a starting system, an internal combustion engine having a starting gear, an electric starting motor of the series type having a normally decentered axially-movable armature which carries a normally disengaged gear engageable with the engine gear upon axial movement of the armature, a source of current supply for the motor, a plurality of electrically connected brush fingers carried by the armature for axial movement therewith, and a plurality of electrically insulated contact segments coöperative with the brush fingers, the brush fingers engaging the contact segments in appropriate relation for first connecting the resistance and the motor field winding in series with the source of current supply and also short circuiting the motor armature winding, and for then short circuiting the resistance and connecting the motor armature and field windings in series with the source of current supply.

3. In a starting system, an internal combustion engine having a starting gear, an electric starting motor having a normally de-centered axially-movable armature which carries a normally disengaged gear engageable with the engine gear upon axial movement of the armature, a source of current supply for the motor, a switch having one element carried by the armature for axial movement therewith and having another element stationary, and circuit connections including an electromagnetic switch having contacts connected between the source of current supply and the motor, and also having an exciting winding responsive to the counter electromotive force of the motor armature.

4. In a starting system, an internal combustion engine having a starting gear, an electric starting motor having a normally de-centered axially-movable armature which carries a normally disengaged gear engageable with the engine gear upon axial movement of the armature, a source of current supply for the motor, a switch having one element carried by the armature for axial movement therewith and another element stationary, and an electromagnetic switch having contacts in the circuit between the source of current supply and the motor, and also having an exciting winding in series with the source of current supply.

5. In a starting system, an internal combustion engine having a starting gear, an electric starting motor having a normally de-centered axially-movable armature which carries a normally disengaged gear engageable with the engine gear upon axial movement of the armature, a source of current supply for the motor, a switch having one element carried by the armature for axial movement therewith and another element stationary, and an electro-magnetic switch having contacts in the circuit between the source of current supply and the motor, and a switch and electrical connections in the circuit of the winding of the electromagnetic switch for connecting the winding to the source of current supply.

6. In a starting system, an internal combustion engine having a starting gear, an electric starting motor having a normally de-centered axially-movable armature which carries a normally disengaged gear engageable with the engine gear upon axial movement of the armature, a source of current supply for the motor, and automatic electric means for interrupting the supply of current to the motor when the armature fails to engage its gear with the engine gear.

7. In a starting system, an internal combustion engine having a starting gear, an electric starting motor having a normally de-centered armature which carries a normally disengaged gear engageable with the engine gear, a source of current supply for the motor, electrical connections for first causing an axial movement of the armature to engage the gears and then a normal rotation of the armature to start the engine, an electromagnetic switch having contacts and an exciting winding in the circuit between the source of current supply of the motor and also having a second exciting winding, and a switch and electrical connections for first connecting the second exciting winding of the electromagnet to the source of current supply to close said contacts and excite the first exciting winding and then for connecting the second exciting winding in such manner as to oppose the first exciting winding and open the contacts in case the armature fails to engage its gear with the engine gear.

8. In a starting system, an internal combustion engine having a starting gear, an electric starting motor having a normally de-centered axially-movable armature which carries a normally disengaged gear engageable with the engine gear upon axial movement of the armature, a source of current supply for the motor, electrical connections including a resistance for first supplying current to the motor to engage the gears and then a normal rotation of the armature to start the engine, an electromagnetic switch having contacts in the circuit between the source of current supply and the motor and also having two exciting windings, one of which is in the circuit between the source of current supply and the motor, and a switch and electrical connections for first supplying the second exciting winding of the electromagnetic switch with current from the source of current supply to close the contacts and for then conducting current around the resistance and through the second exciting winding in a direction to oppose the magnetic effect of the first exciting winding.

In testimony whereof we affix our signatures, in presence of two witnesses.

OTTO HEINS.
CHARLES M. WILD.

Witnesses:
V. W. KLEESRATH,
ROLF LINDENHAYZ.

Copies of this patent may be obtained for five cents each, by addressing the "Commissioner of Patents, Washington, D. C."